Oct. 7, 1969

E. J. DURBIN 3,470,741

MASS FLOW METER APPARATUS

Filed April 30, 1968

INVENTOR.
ENOCH J. DURBIN

BY
Leonard H. King
ATTORNEY

INVENTOR.
ENOCH J. DURBIN
BY
Leonard H. King
ATTORNEY

Oct. 7, 1969  E. J. DURBIN  3,470,741
MASS FLOW METER APPARATUS
Filed April 30, 1968  6 Sheets-Sheet INVENTOR.
Enoch J. Durbin
BY
Marn & Jangarathis
ATTORNEYS Oct. 7, 1969

E. J. DURBIN 3,470,741

MASS FLOW METER APPARATUS

Filed April 30, 1968

INVENTOR.
Enoch J. Durbin

BY

Marn & Jangarathis

ATTORNEYS

United States Patent Office 3,470,741
Patented Oct. 7, 1969

3,470,741
MASS FLOW METER APPARATUS
Enoch J. Durbin, Palo Alto, Calif.
(246 Western Way, Princeton, N.J. 08540)
Continuation-in-part of application Ser. No. 603,609,
Dec. 21, 1966. This application Apr. 30, 1968, Ser.
No. 733,204
Int. Cl. G01f 1/00
U.S. Cl. 73—194                                    26 Claims

ABSTRACT OF THE DISCLOSURE

Mass flow meter apparatus is provided wherein the mass flow of flowing fluids is measured, independent of composition, by directly measuring the ion drift of the medium ion of ionized portions of said fluid.

---

This application is a continuation-in-part of application Ser. No. 603,609, filed Dec. 21, 1966 and now abandoned.

This invention relates to mass flow meter apparatus and more particularly to mass flow meter apparatus which measures the ion drift of an ionized fluid to thereby determine the mass flow thereof.

Although this invention is not limited to any particular application or uses in conjunction with any specified apparatus or combination, a typical application of an embodiment of this invention may be the measurement of air speed. Accordingly, the descriptive matter set out hereinafter will refer principally to uses of the flow meter apparatus of the present invention as anemometers, however, it will be realized, that the mass flow meter apparatus described is of general application.

In a helicopter, for example, a conventional Pitot instrument is not practicable for measuring low speeds because the range of speeds to be measured extends from about 1 knot to about 100 knots. Thus, since the indication of a Pitot instrument is proportional to the square of the forward speed, this would involve the accurate measurement of pressures over a range of 1 to $100^2$.

With the advent of helicopters, VTOL and V/STOL aircraft, the landing, take-off and transition maneuvers occur at low lateral and longitudinal velocities. Thus, one becomes concerned with the dynamics of the vehicle at low air speeds. Landing, in particular, has always been a hazardous situation. This problem becomes critical when the visibility is poor and there is little or no reference point for the pilot to judge his speed.

These types of aircraft operate over wide ranges of air speed and consequently some of the dynamic properties and response parameters of the vehicle undergo vast changes. Primarily, the pilot must know true air speed if he is to know which flight regime (hover or translate) he is operating in and he must be able to quickly learn of changes in air speed.

Typical of the prior art in U.S. Patent 2,783,647 which discloses a gas ionizing means and a downstream ion detection means. The transit time is measured therein to provide an indication of mass flow. The problem of accurately measuring short time intervals renders this approach unfeasible for practical instrumentation.

Another prior art device, as disclosed in U.S. Patent 2,861,452, provides a nuclear anemometer which requires a radioactive source with its attendant cost and hazard-potential disadvantages. Further, the referenced device must be confined within a housing and requires shielding from extraneous ions. The radioactive source spews out radiation in all directions and requires an unusual collector arrangement which interferes with free flow of the fluid stream and introduces errors. In addition, the differential current used therein is not a linear or a unique function of the mass flow, since it is directly dependent upon density, voltage and environmental conditions.

Therefore, it is an object of this invention to provide relatively simple and inexpensive mass flow meter apparatus, usable as anemometer apparatus, which relies upon well-known differential electronic techniques to accurately determine the mass flow of a fluid without reliance upon time measurement or hazardous equipment.

In accordance with this invention, mass flow meter apparatus is provided wherein a transmitting electrode and differential electrode receiving means are positioned proximate to the fluid stream of interest. The differential current between the electrode receiving means, which results from the ion drift caused by the fluid stream of interest, is then relied upon to directly indicate the desired mass flow of the fluid stream. The invention will be more clearly understood by reference to the following detailed description of several embodiments thereof in conjunction with the accompanying drawings in which:

Figure 1:
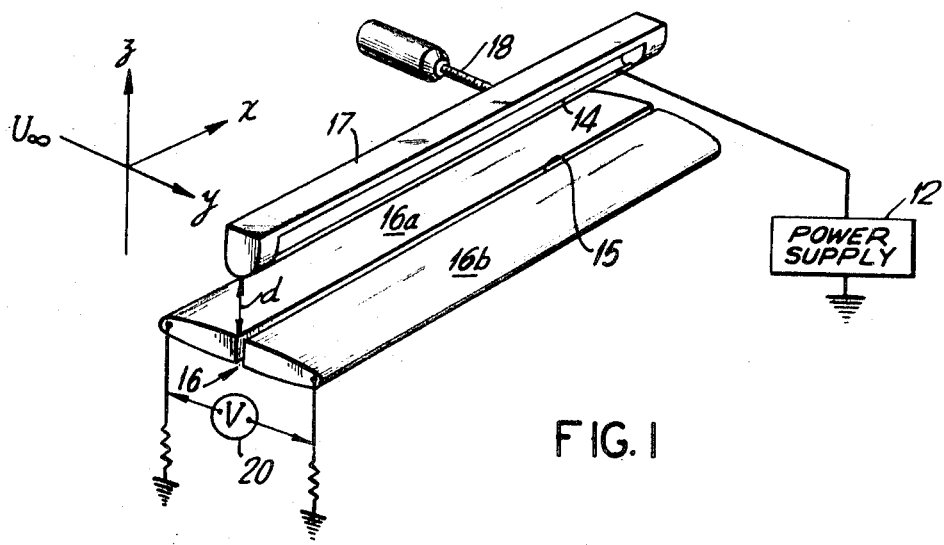
FIGURE 1 is a combined pictorial and electrical circuit diagram showing schematically one form of the invention.

Referring now to the drawings and, more particularly, to FIGURE 1 thereof, there is shown a first embodiment of the mass flow meter apparatus according to the present invention. As shown in FIGURE 1, apparatus is provided wherein ions are caused to be discharged from a point source 14 across a fluid stream $U_{00}$ towards a split collector plate 16. The ion flow is maintained substantially perpendicular to the flow of fluid. A power supply 12 is connected between a wire 14, serving as the point source, and the collector plates 16. With the ion potential held constant and with no fluid flow, the collector plates 16a and 16b are positioned so that the slit 15 separating the plates is centered exactly at the median point of the ion flow stream. This is done by measuring the voltage difference between the two plates and adjusting the wire 14 relative to the position of the slit 15 until the voltage difference, as shown on differential voltmeter 20, is zero, indicating that the current flow in each plate is equal.

As the fluid flows, the position of the median ion of the stream is displaced in exact proportion to the flow velocity. To measure the displacement, the wire carried by insulator frame 17 is repositioned by micrometer screw 18 until the differential voltage is again zero. This manually adjustable embodiment would be suitable for use in wind tunnel applications.

Figure 2:
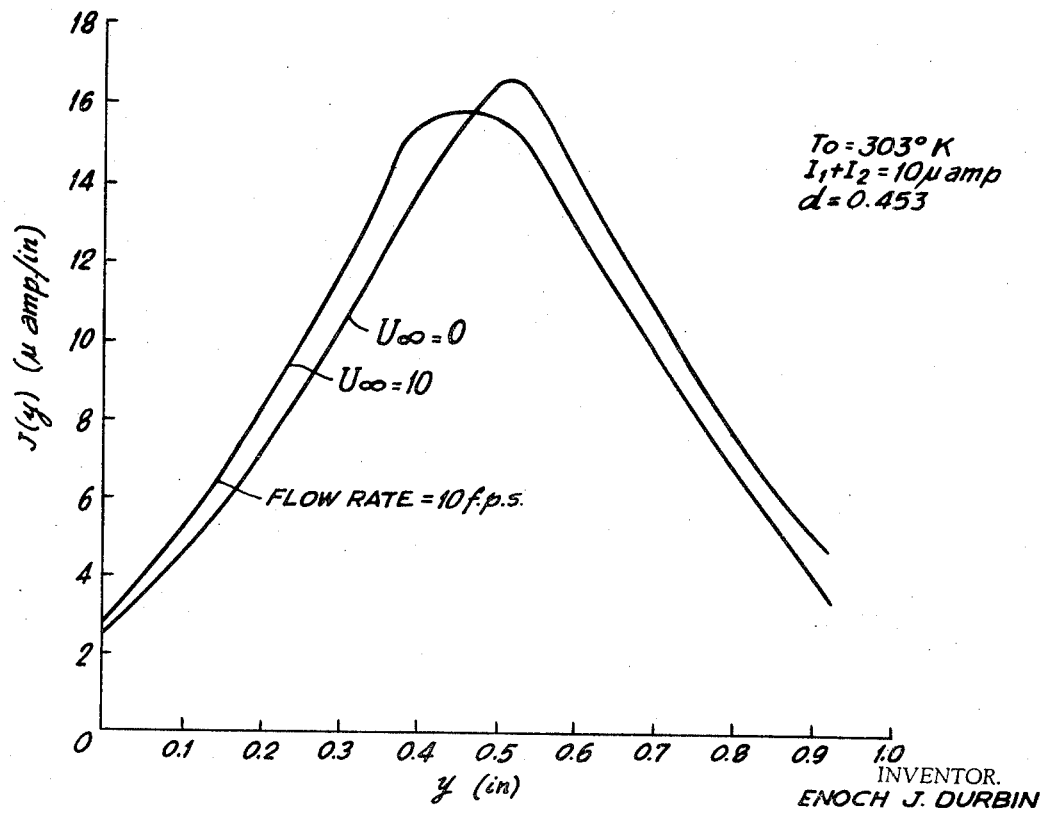
FIGURE 2 shows graphically the drift of ions in a flow stream and is a plot of current density distribution vs. ion displacement.

FIGURE 2 shows a distribution of the current density per linear inch of cathode (parallel to the anode) under static and flowing conditions, using air as the fluid. The original distribution is symmetrical with the median ions at the apex ($y=0.525$). With air velocity at 10 f.p.s., the apex or median position is moved to $y=0.465$. The vertical distance between anode and cathode, $d$, was 0.453 inch.

Figure 3:
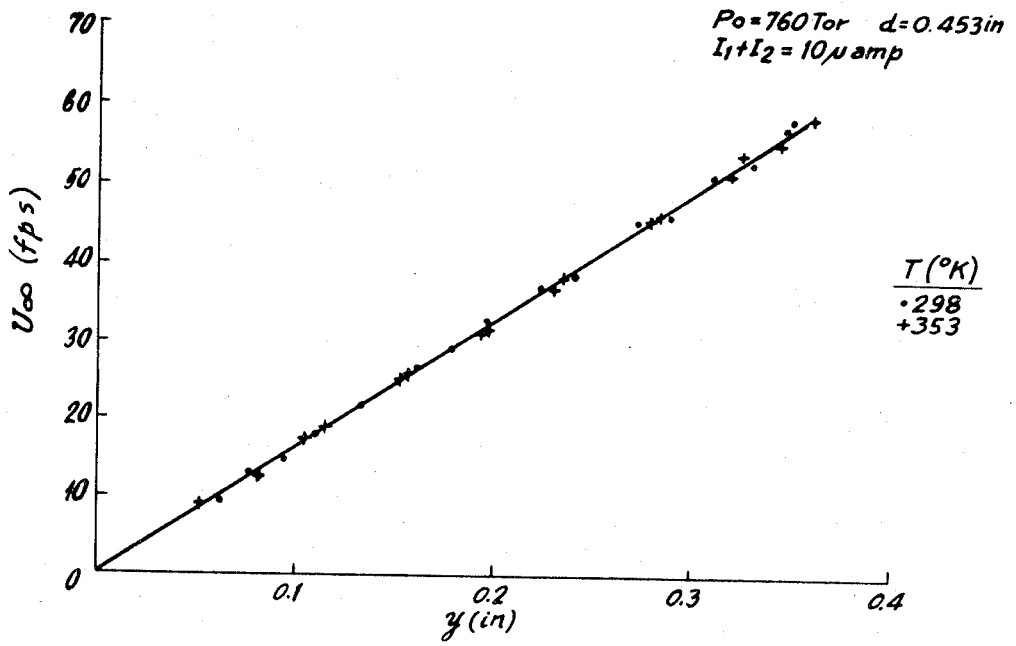
FIGURE 3 shows graphically the relationship of fluid stream velocity vs. ion displacement for two different operating temperatures.
Figure 4:
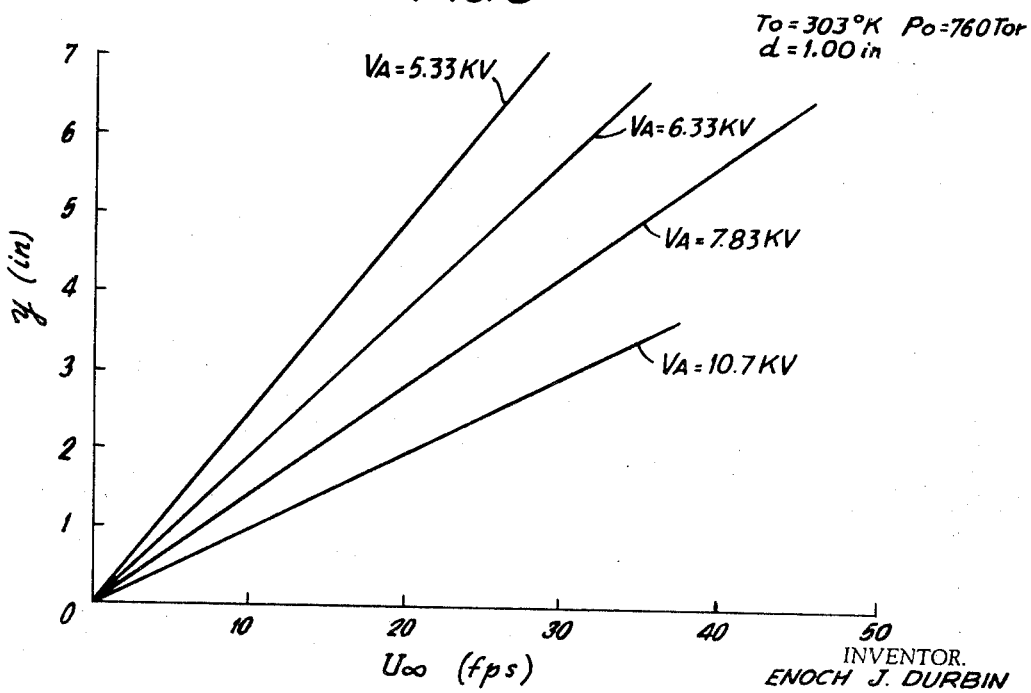
FIGURE 4 shows graphically the relationship of fluid stream velocity vs. ion displacement for a series of different operating voltages.
Figure 5:
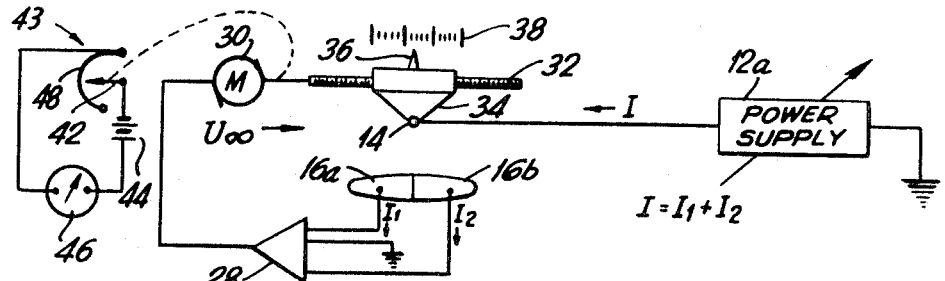
FIGURE 5 is a combined pictorial and electrical circuit diagram showing schematically another form of the invention.

The remarkable accuracy and freedom from temperature and density effects are shown in FIGURE 3 for air flowing from 10 to 60 f.p.s. at temperatures of 298° K. and 353° K. and atmospheric pressure of 760 torr. Another feature of this device is its extreme rangeability. By simply changing the voltage applied, as by means of a variable power supply 12a, as shown in FIGURE 5, thus changing the field gradient across the discharge path, the same device could be used as an air speed indicator with a minimum full scale of 0 to 10 f.p.s. and an upper full scale of 0 to 1000 m.p.h. (see FIGURE 4). In this test, the anode to cathode spacing, $d$, used was 1.00 inch. Furthermore, the output always is exactly linear and passes through a zero calibration point with the lower reading limited only by the sensitivity of the system. In most present air speed indicators, there is a lower practical range below which there is not enough signal energy to operate the instrument.

In FIGURE 5, there is shown a self-balancing embodiment wherein the outputs from the two cathode members 16a and 16b are fed to differential amplifier 28 whose output is fed to a reversible motor 30 arranged to rotate screw 32 so as to drive traveling nut 34, which carries anode 14 in a direction which will balance the current $I_1$ and $I_2$ so as to null the output of amplifier 28. The traveling nut 34 carries a pointer 36 which indicates on scale 38 the flow velocity. Remote indication may be readily obtained by driving a wiper 42 of rheostat 43 from the motor drive chain. The wiper is in series with a power source 44, shown by way of example as a battery, an ammeter 46 and the winding 48 of rheostat 43. Other equivalent remote indicators may be substituted, for example, a digital or other type of encoder may be used for telemetering.

Figure 6:
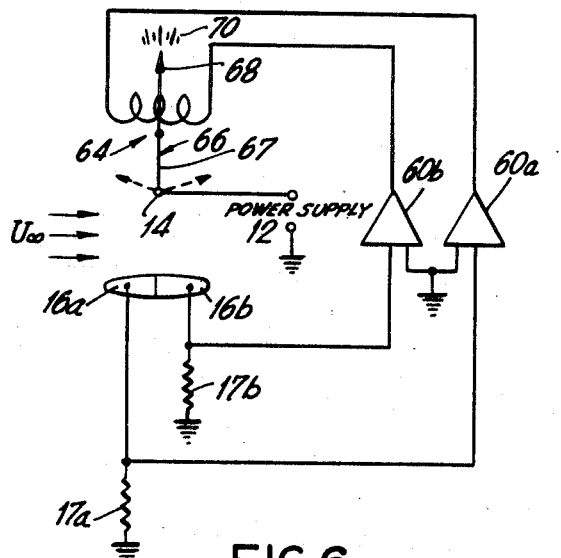
FIGURE 6 is a combined pictorial and electrical circuit diagram showing schematically another form of the invention.

Still another embodiment of the invention is shown in FIGURE 6. In this embodiment, power supply 12 energizes anode 14 and cathode members 16a and 16b. Resistors 17a and 17b are in series with the respective cathodes and power supply 12. Amplifiers 60a and 60b detect the voltage across the respective resistors 17a and 17b. The outputs of the amplifiers are fed to opposite sides of the winding 62 of galvanometer 64. The tail end 67 of the pointer 66 of the galvanometer carries the anode 14 and the head end 68 of the pointer operates in combination with scale 70. The amplifiers then simply position the galvanometer pointer to maintain equal ion current flows in each of the cathode members.

It will be appreciated that in all embodiments the device will bidirectionally sense the flow direction and magnitude.

Figure 7:
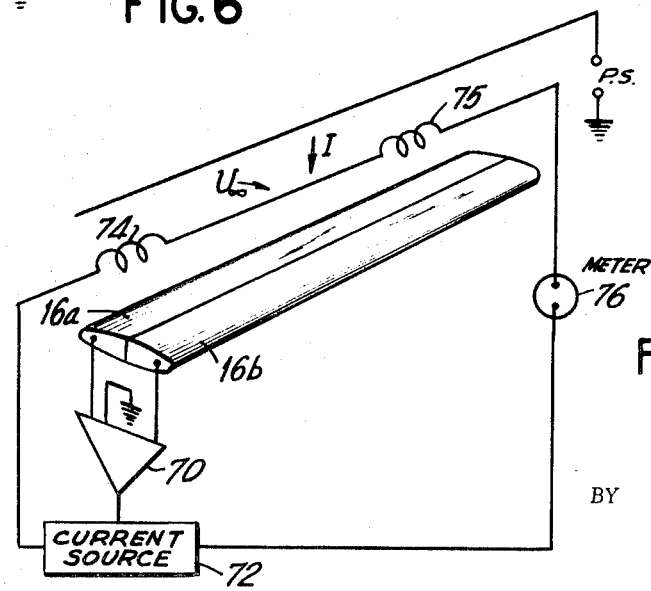
FIGURE 7 is a combined pictorial and electrical circuit diagram showing schematically another form of the invention.

FIGURE 7 discloses still another embodiment of the invention wherein the output of differential amplifier 70 is used to control the output of current source 72.

The output of the current source 72 is used to energize coils 74 and 75 to generate a magnetic field to control the ion beam and deflect it in a direction tending to null amplifier 70. Current meter 76 will bidirectionally indicate the magnitude and direction of fluid flow.

Figure 8:
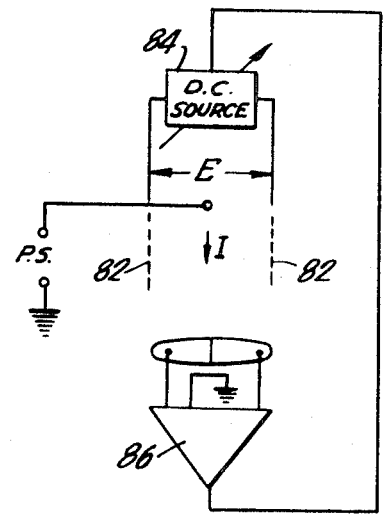
FIGURE 8 is a combined pictorial and electrical circuit diagram showing schematically another form of the invention.

FIGURE 8 shows an electrostatic version similar to the device of FIGURE 7. In this case, the magnetic field coils are replaced by screens or grids 82 which are charged by adjustable D.C. source 84, the output of amplifier 86 being used to control the D.C. source 84.

The terms "point ion source" is intended to encompass ion sources having extremely small dimension in the direction of fluid flow (the "$y$" axis in FIGURE 1).

The operating conditions are such that the particles of the fluid stream are ionized and the reference to the ion stream is to the said particles of the fluid stream which have been ionized. This can be accomplished, for example, by establishing a corona discharge between the depicted electrodes of opposite polarity, however, other modes of operation well known to those of ordinary skill in the art may be used as well. In brief, the phenomenon of corona discharge may be described, although not completely understood, as a partial breakdown of the dielectric strength of a gap between two electrodes, the breakdown occurring at highly stressed regions thereof. It is associated with a current on the order of $10^{-6}$ amperes (as opposed to the currents on the order of $10^{-9}$ amperes which are observed for voltages below "threshold") which precedes the higher currents resulting from the total breakdown or spark-over of the gap. The term corona, derived from the French word "couronne" meaning crown, aptly describes the glow or luminous effect often visible at the highly stressed electrode. The current from the corona may be fluctuating or intermittent in nature, at potentials just above threshold. The higher the potential is raised the steadier the observed current becomes, although on a micro scale, a very rapid pulsing current called the Trichel pulse is observed. At still higher potentials, steady state conditions or onset of steady corona is observed. For a limited range above this steady state the current varies linearly with voltage, the so-called Ohms law regime. At still higher potentials, the corona current increases more rapidly following a squared relationship with voltage and eventually terminates in a complete spark breakdown. Corona discharge has been mentioned as exemplary because the ionized particles of the fluid do not have a tendency, under these conditions to lose their mass flow or velocity component thereby affording calibration simplicity, however, other forms of discharge may be equally advantageous.

In the embodiments described above, the mass flow meter apparatus was nulled in each case and thereby the mass flow was determined by the precision relocation of the ion transmitting electrode to thus relocate the effective position of the median ion. As can readily be appreciated, in some instances, such relocation of the median ion by the selective repositioning of the ion transmitting electrode is not preferable or desirable. Thus, FIGURES 9–12 depict mass flow meter apparatus according to the instant invention which may be relied upon where constant calibration is inconvenient, space and weight considerations are of paramount importance, and high reliabilty is demanded.

Figure 9:
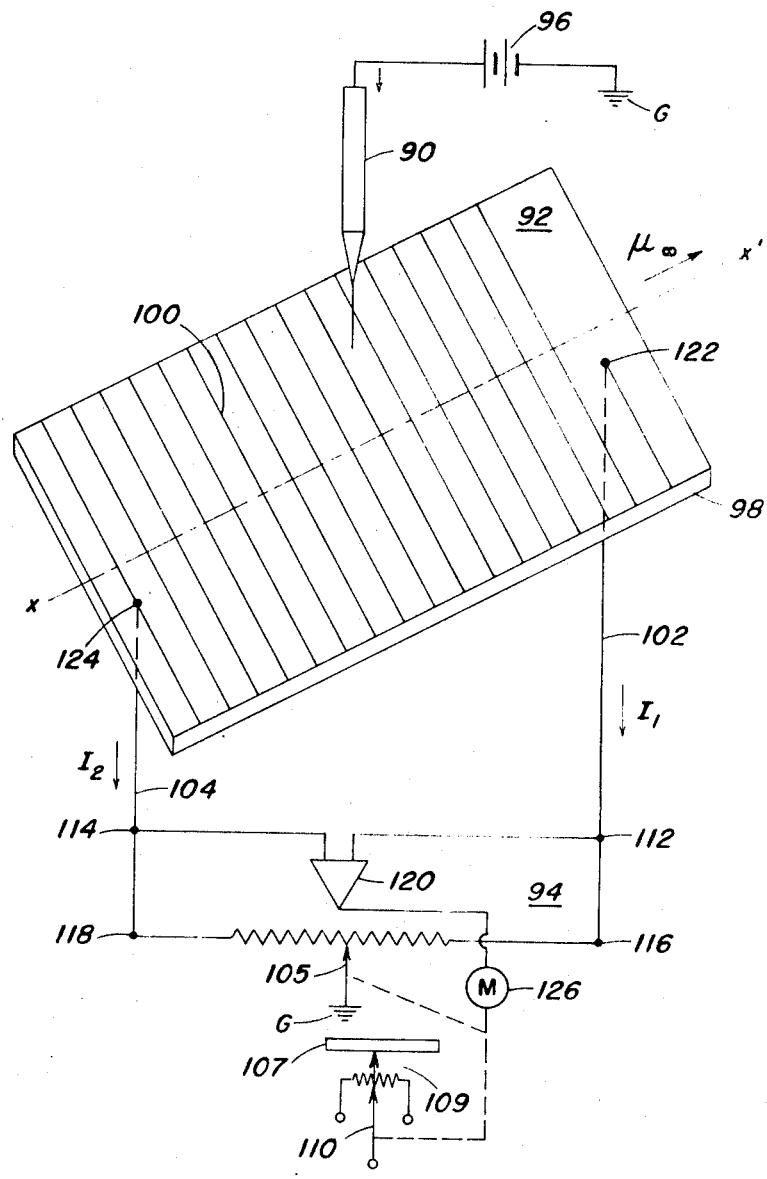
FIGURE 9 is a combined pictorial and electrical circuit diagram depicting a further embodiment of the present invention wherein a non-movable source is utilized.

The mass flow meter apparatus shown in FIGURE 9 comprises an ion transmitting electrode 90, ion receiving electrode means 92, and a bridge circuit 94. The ion transmitting electrode 90 is connected to a source of D.C. potential, herein indicated as battery 96, which source of D.C. potential is grounded at G. The ion receiving electrode means 92 includes a suitable, nonconductive substrate 98, which may be made, for instance, of glass or ceramic, and a resistive member 100 herein shown as resistive wire wound on said substrate 98. Alternatvely, the resistive member 100 may take other well-known forms such as a resistive coating. A current conductor 102 is connected to a first terminal 122 of the resistive winding as shown, and a second current conductor 104 is connected to the second terminal 124 thereof. The current conductors 102 and 104 are further connected to bridge circuit 94 at terminals 112 and 114 respectively which terminals constitute the output terminals of the self-balancing bridge circuit 94.

The self-balancing bridge circuit 94 includes a potentiometer connected intermediate terminals 116 and 118 having a variable position slider 105 which is grounded at G. The first and second portions of the potentiometer, as defined respectively by the resistance between terminals 116 or 118 and the variable position slider 105 form the third and fourth arms respectively of the resistance bridge completed by bridge circuit 94. The first and second arms thereof are formed respectively by the first and second portions of the resistive members 100 which portions are here defined as the resistance of resistive member 100 intermediate terminal 122 or 124, respectively, and the point of impingement thereon of the median ion mirgrating toward the ion receiving electrode means 92 from the ion cloud surrounding the ion transmitting electrode 90 when the same is energized in the presence of a fluid. Also included within the bridge circuit 94 are the additional circuit components which render the instant circuit self-balancing. Such additional circuit components may comprise any of the widely used forms known to those of ordinary skill in the art, however, to facilitate this description, an exemplary showing of one such form has been depicted in FIGURE 9. Thus, additionally present in the depicted bridge circuit is a differential amplifier 120, a reversible motor 126 and output potentiometer 109. The differential amplifier 120 has its two input terminals connected respectively to the bridge output terminals 112 and 114, and the output thereof is electrically connected to reversible motor 126. The differential amplifier 120 may be externally or internally grounded as shown. The reversible motor 126, which is energized by the output of the differential amplifier 120, is mechanically coupled to the variable position slider 105 of the bridge potentiometer and the variable position slider 110 of the output potentiometer 109 as indicated by the dashed connections thereto. A scale 107 is mounted behind the output potentiometer 109 to act as an indicating device therefor. The scale 107 indicates the slider 110 setting of the potentiometer 106, but is calibrated in terms of the desired mass flow units.

In operation, the mass flow meter apparatus depicted in FIGURE 9 may be initially calibrated at the place of manufacture so that the median ion of the ion cloud present at the transmitting electrode 90, when energized in the presence of a fluid having a zero mass flow, strikes the ion receiving electrode means 92 at a desired location. In the depicted embodiment, this location is indicated as at the center position wherein there is equal resistance between said location and each of the conductors 102 and 104. However, it should be noticed that any desired location on the resistive member is available for the initial zero setting and in actuality, where anemometer application is contemplated, it is probable that an off-center position will be selected so that the ion cloud may move further in one direction than the other as forward speeds will normally exceed rearward speeds. When this condition is established, the potentiometer sliders 105 and 110 should be in the requisite position such that the resistance ratios of their respective potentiometers are the same as the resistance ratio of the previously defined first and second portions of the resistive member 100 and the scale 107 reads zero. The transmitting electrode 90 may then be fixedly mounted in such position as further calibration, in the absence of severe shipping shocks, will be unnecessary or can be accomplished by resetting scale 107 to zero. Thereafter in operation in terms of the median ion, a linear field distribution is established between the transmitting electrode 90 and the receiving electrode means 92 such that the deflection of the median ion of the fluid stream is linear with respect to the mass flow. This linear field is of sufficient magnitude so that a steady current ion discharge therebetween is maintained. The fluid which may be assumed to have a mass flow in the direction indicated by the vector $U_\infty$ is thereby partially ionized and the position of the median ion in the stream thereof is displaced linearly in proportion with the mass flow. Because the position of the median ion has been displaced from the initially calibrated location to a new location where there is less resistance between said second location and conductor 102 than between said second location and conductor 104; current $I_1$ will be larger than current $I_2$.

Since the location of the point at which the median ion impinges upon the resistive member 100 has been displaced by the fluid flow $U_\infty$, a distance along the axis $x–x'$ which is proportional to the magnitude and in the direction of the vector $U_\infty$, the resistance of the first portion of the resistive member 100 will be decreased while the resistance of the second portion thereof will be increased. The change in the respective resistances of said first and second portions of the resistive member 100 unbalances the resistance bridge completed by the bridge circuit 94 as the ratio of the first portion of said resistance member 100 to the resistance between slider 105 and terminal 116 is no longer equal to the ratio of the second portion of said resistance member 100 to the resistance between slider 105 and terminal 118. This unbalanced condition of the bridge circuit will cause, in the well-known manner, a difference in the potential between terminals 112 and 114 which terminals constitute the output terminals of the resistance bridge and the input terminals to the differential amplifier 120. The differential amplifier 120 responds, in the well-known manner, to produce an output signal which is proportional to the difference in potential applied to its respective input terminals 112 and 114 and this signal is applied via the conductor shown to the reversible motor 126.

The reversible motor 126, thus energized by the output signal of the differential amplifier 120, will vary the position of sliders 105 and 110 until it is subsequently de-energized by the removal of an input signal thereto which occurs when the bridge is again in a balanced condition. With the mass flow vector $U_\infty$ in the direction shown, the reversible motor 126 will drive sliders 105 and 110 to the right to thereby rebalance the resistive bridge and indicate the slider position of potentiometer 109, in terms of mass flow units on scale 107. Thus, under these conditions, the scale 107 will indicate the magnitude and direction of the mass flow vector $U_\infty$ by indicating the magnitude thereof to the right of its zero position which magnitude indication is effectively a determination of the position of the median ion.

As the motor 126 is reversible, it will respond to an opposite polarity energizing signal from the differential amplifier 120 to drive sliders 105 and 110 to the left. Such an opposite polarity energizing signal would be caused by a mass flow vector $U_\infty$ oppositely directed from that shown which would displace the position of the median ion to the left thereby decreasing the resistance of the second portion of the resistive member 100 and increasing the resistance of the first portion thereof with respect to the zero, calibrated position. This displacement would cause an opposite polarity voltage differential from that previously described between terminals 112 and 114 thus causing an opposite polarity output signal to be applied from the differential amplifier 120 to the reversible motor 126. The sliders 105 and 110 will thus be driven to the left until the bridge is again rebalanced and the magnitude of this vector is indicated to the left of the initially calibrated zero position of scale 107.

It should be noted that the mass flow meter depicted in FIGURE 9 is a highly directional device in that it is only responsive to the displacement of the median ion of an ion stream along the axis indicated $x–x'$ in FIGURE 9. Therefore, if the flow of the fluid is at an angle to axis $x–x'$, the depicted flow meter apparatus will only measure the component of the mass flow of the fluid along this axis.

Further, although a resistance bridge balancing technique has been disclosed with regard to FIGURE 9, it will be obvious to those of ordinary skill in the art that a current balancing bridge technique could be substituted therefor.

Figure 10:
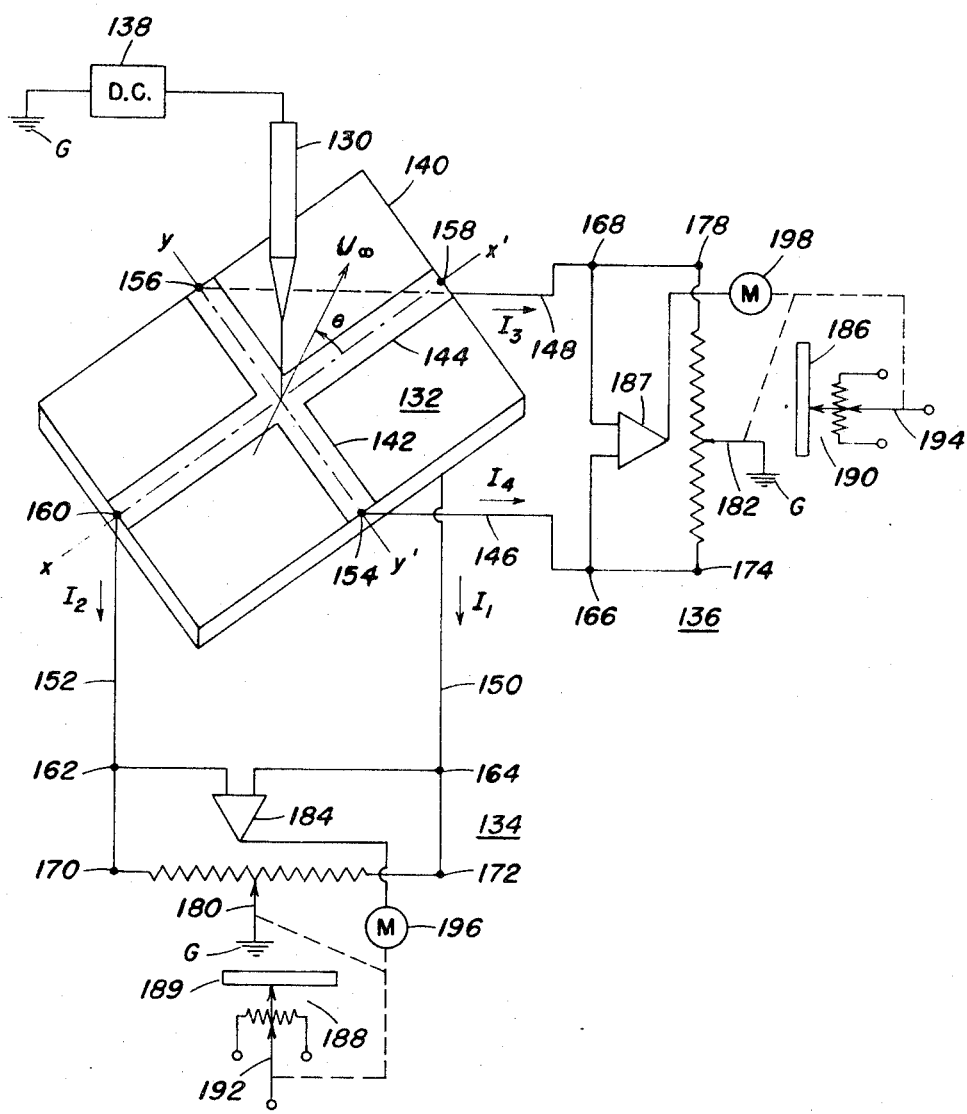
FIGURE 10 is a combined pictorial and electrical circuit diagram which shows a multiple axis form of this invention.

The mass flow meter embodiment as shown in FIGURE 10 represents a multi-directional alternative to the uni-directional apparatus as described with regard to FIGURE 9. Since much of the apparatus shown in this embodiment is similar in form and function to that described above with regard to FIGURE 9, where applicable, reference in the disclosure thereof will be made to like structure or function as previously described to avoid repetition.

The mass flow meter apparatus shown in FIGURE 10 comprises an ion transmitting electrode 130, ion receiving electrode means 132, and a plurality of bridge circuits 134 and 136. The ion transmitting electrode 130 is connected to a source of D.C. potential 138 which in turn is connected to ground at G. The ion receiving electrode means 132 includes a suitable substrate 140 of the kind described with regard to FIGURE 9 and a plurality of resistive members 142 and 144 which are here shown as resistive coatings or films, but may take other well-known forms. A current conductor 146 or 150 is connected to a first end terminal 154 or 158, respectively, of each of the resistive films 142 or 144, respectively, as shown, and a second current conductor 148 or 152 is connected to a second end terminal 156 or 160, respectively, thereof. Each pair of the conductors 146 and 148 or 150 and 152 are further connected to individual self-balancing bridge circuits 136 or 134, respectively, which control the position of the respective variable position sliders 182 and 194 or 180 and 192 in accordance with the point of impingement of the median ion on its respective resistive member 144 or 142 in the same manner as that described with regard to FIGURE 9. Scales 186 and 189, calibrated in terms of mass flow units, are provided to indicate the scale setting of output potentiometer 190 or 188, respectively, as was the case in FIGURE 9, and the individual bridge circuits 136 or 134 generally take the same form and function in the same manner as the bridge circuit there described.

In operation, the mass flow meter apparatus embodiment as shown in FIGURE 10 may be initially calibrated at the place of manufacture in the same manner as was the mass flow meter described with regard to FIGURE 9. Here, however, initial calibration requires the requisite median ion to strike the ion receiving means 132 at a desired zero location on each of resistive members 142 and 144. When this condition obtains, each of scales 189 and 186 may be zeroed and their respective output and bridge potentiometers should have the same resistance ratio as their respective resistive members 142 or 144, respectively, as fixed by the point of impingement of the respective median ion under zero mass flow conditions. The ion transmitting electrode 130 may then be fixedly mounted in similar manner to that described with regard to FIGURE 9. Thereafter, in subsequent operation wherein it is desired to measure an unknown mass flow, an electric field is established by the energization of the transmitting electrode 130 such that the median ion of the fluid stream is deflected linearly by the mass flow of the fluid. The field is again of sufficient magnitude so that a steady current ion discharge between the transmitting electrode 130 and the ion receiving electrode 132 is maintained. The fluid under test is thereby partially ionized and the position of the median ion thereof is displaced linearly in proportion to the mass flow. Depending on the direction of the fluid under test, the linear displacement of the median ion thereof will be resolved by the apparatus depicted into its vectorial components along the respective axes of the resistive coatings 142 and 144 indicated respectively as $y-y'$ and $x-x'$. Therefore, assuming the direction of the fluid flow is not parallel to either axis $x-x'$ or $y-y'$, the position of the requisite median ion is displaced from the initially set, zero calibration location to a second position for each respective axis wherein the resistance between said position and each of the end terminals thereof has been changed. The relative linear displacement component along each of the axes $x-x'$ and $y-y'$ will be determined by the angle of the direction of the flow in relation to that particular axis. Thus, if the direction of the flow vector $U_\infty$ is in the direction shown, the displacement of the median ion component along the $x-x'$ axis will be proportional to $|U_\infty| \cos \theta$ while the displacement of the median ion component along the $y-y'$ axis will be proportional to $|U_\infty| \sin \theta$.

As the resistive coatings 142 and 144 are each formed, due to their connection to bridge circuits 134 or 136, respectively, into separate resistance bridge arrangements of the kind described with regard to FIGURE 9, each bridge formed operates separately in the manner there described for its respective component of the linear displacement of the median ion. In the case described, each bridge thus formed will become unbalanced such that the resistance of the first portion, i.e., that between the position of the requisite median ion and terminal 158, of resistive member 144 will decrease while the resistance of the second portion thereof will increase and the resistance of the second portion, i.e. that between the position of the median ion and terminal 156, will decrease while the resistance of the first portion thereof will increase. The self-balancing bridges 134 and 136 in this case will function in the manner described with regard to FIGURE 9 to reposition slider 180 to the right and slider 182 upward such that a balanced condition is again achieved for each bridge. The respective vectorial components of the mass flow vector $U_\infty$, resolved in the depicted axial directions will thereby be directly indicated on scales 189 and 186.

The multi-directional mass flow meter apparatus according to this invention, as depicted in FIGURE 10, is again a highly directional device and thus will only respond to mass flow vectors which reside in the plane defined by its axial directions. Further, this apparatus is preferably provided with bridge circuits having reversible motors therein such that mass flow in any direction of the selected plane may be ascertained. In addition, the mass flow meter apparatus depicted in FIGURE 11 will generally admit of the same modifications which pertain to the FIGURE 9 embodiment as their structural make-up is quite similar.

Figure 11:
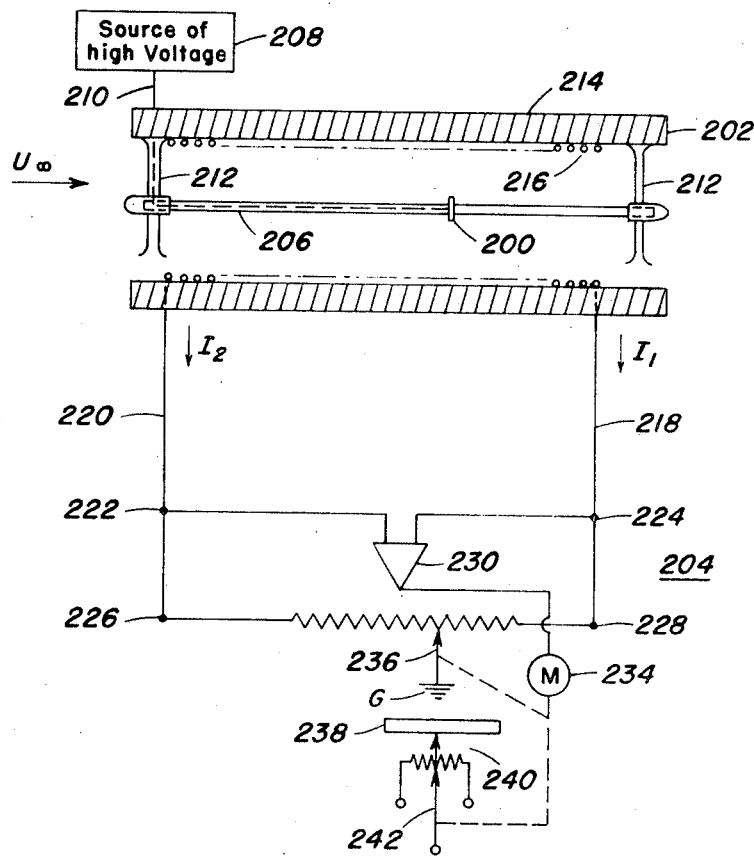
FIGURE 11 is a combined pictorial and electrical circuit diagram which shows a coaxial form of this invention.

An alternate compact form of the bridge balancing mass flow meter apparatus according to the present invention is illustrated in FIGURE 11. The mass flow meter apparatus depicted in FIGURE 11 comprises an ion transmitting electrode 200 in the form of a thin circular disc, an ion receiving electrode means 202 of circular cross section, and a self-balancing bridge circuit 204 which may be of the type described with regard to FIGURE 9. The ion transmitting electrode 200 is mounted upon the support rod 206 within the ion receiving electrode means 202 and positioned so as to be perpendicular to the major axis thereof. The support rod 206 is mounted within the ion receiving electrode means 202 by a plurality of mounting struts 212 which are positioned at either end of the supporting rod 206 about the inside surface of the ion receiving electrode means 202. The mounting struts 206 are preferably aerodynamically shaped so as not to disrupt the fluid flow passing through the ion receiving electrode means 202 as indicated by the vector $U_\infty$. A source of high voltage 208 is connected to the ion transmitting electrode 200 via connector 210 which may be threaded through a mounting strut 212 and the supporting rod 206, as indicated, so as not to interfere with the flow of fluid. The ion transmitting electrode 200 may take the form of a disc having a thickness of one or two mils wherein the edges thereof are sharpened and the high voltage connection is made to the center thereof.

The ion receiving electrode means 202 includes a hollow cylindrical substrate member 214 and a resistive member 216 suitably wound therein. The hollow substrate member 214 is made of suitable dielectric material such as glass or ceramic to withstand the force of the fluid flowing therethrough and the resistive member 216 may again take the form of either a resistive wire wound therein, as shown, or a continuous resistive coating deposited upon the entire inside surface area of the cylindrical, hollow substrate member 214.

A first current conducting member 218 is connected to a first end terminal of resistive member 216 and a second current conducting member 220 is connected to the second end terminal thereof. The first and second current carrying members 218 and 220 are connected to the self-balancing bridge circuit 204. The bridge circuit 204, as previously mentioned, may take the same form as that disclosed with regard to FIGURE 9 and acts in the manner described therein to control the position of the variable position sliders 236 and 242 via the differential energization of the reversible motor means 234 to thereby locate and indicate the position of the median ion. An output potentiometer 240 having a scale 238 is again relied upon to perform the same function in the same manner as the previously described scale indicia devices.

In the embodiment disclosed in FIGURE 11, though neither a point ion transmitting electrode nor a line like ion receiving electrode means were relied upon, the same resultant effect of linearity will be present as if a linear field were produced. This occurs because the disc ion transmitting means 200, due to its circular shape, may be treated as an infinite number of point sources, each of which impinges ions on its respective counterpart of the infinite number of line receiving means making up the ion receiving electrode means 202 which takes the form of a right circular cylinder. Further, due to this relationship, even though an infinite number of median ions will be produced, each will theoretically impinge its respective line ion receiving means at the same point and thus the previously utilized median ion analysis may still be relied upon. Thus, the operational analysis of the FIGURE 11 embodiment may proceed in the same manner as those previously described.

In operation, the mass flow meter apparatus illustrated in FIGURE 11 is initially calibrated at the place of manfacture as was the apparatus described with regard to FIGURE 9. Thus, the point of impingment of the median ions on a circumferential segment of the cylindrical ion receiving electrode means 202 is set to a desired location whereby the bridge potentiometer between terminals 226 and 228 and the output potentiometer 240 have the same resistance ratio as the first and second portions of the resistive member 216. The scale 238 then reads zero. Thereafter, in subsequent operation wherein it is desired to measure an unknown mass flow, the transmitting electrode 200 is energized by potential source 208 with voltage of a sufficient magnitude such that an ion discharge is established between the ion transmitting electrode 200 and the ion receiving electrode means 202. The fluid under test will thereby be partially ionized and the mass flow vector $U_\infty$ thereof will linearly displace the position of the median ions a distance which is directly proportional to the magnitude of such vector $U_\infty$. The linear displacement of the position of the median ions will, in the manner previously specified with regard to FIGURE 9, cause a voltage imbalance in the resistance bridge completed by bridge circuit 204. The self-adjusting bridge circuit will respond thereto and modify the position of the variable position sliders 236 and 242 to thereby rebalance the bridge and indicate the desired mass flow, as represented by the position of the median ion on scale 238. Thus, if the mass flow vector $U_\infty$ is in the direction shown, the reversible motor 234 included within the bridge circuit 204 will cause the variable position sliders 236 and 242 to move toward the right, thereby decreasing the resistance of the right-hand portion of their respective potentiometers and increasing the resistance of the left-hand portions thereof until the resistance bridge is again in a balanced condition. The mass flow of the fluid will then be indicated on the scale 238 in similar manner to that previously specified above.

The embodiment illustrated in FIGURE 11 is a highly directional device in that it will only respond to the displacement of the median ions of the ion stream along the axial direction of the cylinder. Furthermore, the structure depicted in FIGURE 11 will readily admit of the modifications mentioned above with regard to FIGURE 9.

Although the various mass flow meters in accordance with this invention, as described herein, have been characterized, for simplicity, as singular devices which will measure only a single mass flow, it will be obvious that various combinations thereof may be combined to achieve a particular function. Thus, for instance, if it were desired to utilize the mass flow meter concepts of the instant invention in a thrust meter configuration, usable for aircraft, two or more of the mass flow meter devices depicted herein could be used in combination wherein one would be placed so as to measure the mass flow of air through the engine while the other(s) was placed so as to measure the mass flow of the air through which the aircraft and its engine were moving.

In addition, it should be apparent that the polarity of the ion transmitting electrode can be either positive or negative depending upon the polarity of the potential source connected thereto. However, the selection of the desired polarity should be made in a manner to insure that the ions produced thereby will be of similar weight to the particles of the fluid so that the linear displacement of the median ion will remain proportional to the mass flow of the fluid.

Further, it will be obvious to those of ordinary skill in the art, that various alternative structures may be utilized with the compact embodiments of the instant invention as illustrated in FIGURES 9–11. For instance, the potential sources utilized to energize the ion transmitting electrodes depicted therein may be variable so as to vary the full scale readings thereof in a manner similar to that mentioned in regard to FIGURE 3 and/or the ion transmitting electrodes could be utilized in conjunction with an electrostatic grid to form a point grid system whereby the established field may be made uniform. Additionally, current balancing bridges could be substituted for the resistance bridges shown herein without any substantial deviation from the teachings of the present invention.

Thus, it is seen that inexpensive flow meter apparatus having a relatively simple mode of operation has been provided which apparatus relies upon well-known differential electronic techniques to accurately determine the mass flow rate of fluids over wide ranges without necessitating the use of hazardous equipment or the precise measurement of selected time intervals.

I claim:

1. Mass flow meter apparatus for measuring the mass flow of fluids passing therethrough comprising:
   ionizing means having a first polarity, when energized, located proximate to the path of fluid flow;
   ion collecting means having a second polarity, when energized, located proximate to said path of fluid flow opposite to said ionizing means, said ionizing means, when energized in the presence of a fluid, having a plurality of ions of the fluid stream formed thereabout in a deflectable distribution, said plurality of ions formed thereabout migrating toward said ion collecting means and impinging thereon; and
   means responsive to the point of impingement of the median ion on said ion collecting means to measure the displacement thereof effected by mass flow variations, whereby the displacement of the point of impingement of the median ion in the presence of a flow as measured from the point of impingement of the median ion in the presence of a reference flow is representative of the mass flow.

2. The apparatus of claim 1 wherein said ion collecting means has at least first and second portions, one of said portions being located upstream of the other when fluid flows along said flow path, said first and second portions of said ion collecting means adapted to develop first and second currents respectively when said ionizing means is energized in the presence of a fluid.

3. The apparatus of claim 2, additionally comprising means to vary the potential gradient between said ionizing means and said ion collecting means.

4. The apparatus of claim 2, wherein said means responsive to the point of impingement of the median ion includes comparison means and current equalizing means for adjusting the magnitudes of said first and second currents which may be present in said first and second portions respectively.

5. The apparatus of claim 4, wherein said first and second portions of said ion collecting means comprise first and second discrete ion collecting means spacially positioned adjacent to each other and said ionizing means approaches a point source of ionizing potential.

6. The apparatus of claim 4, wherein said current equalizing means comprises means to spacially change the position of said ionizing means with relation to said first and second portions of said ion collecting means.

7. The apparatus of claim 6, wherein said means to spacially change the position of said ionizing means includes reversible motor means responsive to signals produced by said comparison means to spacially change the position of said ionizing means with relation to said first and second portions of said ion collecting means to thereby equalize said first and second currents.

8. The apparatus of claim 7, wherein said first and second portions of said ion collecting means comprise first and second discrete ion collecting means spacially positioned adjacent to each other and said ionizing means approaches a point source of ionizing potential.

9. The apparatus of claim 4, wherein said current equalizing means for adjusting the magnitudes of said first and second currents includes electrostatic ion deflecting means for controlling the path of ions migrating from said ionizing means to said ion collecting means.

10. The apparatus of claim 9, wherein said electrostatic ion deflecting means produces an electrostatic field whose intensity is controlled by signals produced by said comparison means.

11. The apparatus of claim 4, wherein said current equalizing means for adjusting the magnitudes of said first and second currents includes magnetic ion deflecting means for controlling the path of ions migrating from said ionizing means to said ion collecting means.

12. The apparatus of claim 11, wherein said magnetic ion deflecting means produces a magnetic field whose intensity is controlled by signals produced by said comparison means.

13. The apparatus of claim 2, wherein said ion collecting means comprises substrate means having resistive member means mounted thereon, said resistive member means having first and second end terminals, said first portion of said ion collecting means being defined as the resistive portion thereof between the point of impingement on the resistive member of the median ion of the ion cloud surrounding said ionizing means when said ionizing means is energized and said first end terminal and said second portion of said ion collecting means being defined as the resistive portion thereof between said point of impingement of said median ion and said second end terminal.

14. The apparatus of claim 13, wherein said resistive member comprises a resistance wire wound on said substrate.

15. The apparatus of claim 13, wherein said resistive member comprises a resistive layer of material deposited on said substrate.

16. The apparatus of claim 13, wherein said ionizing means approaches a point source.

17. The apparatus of claim 13, wherein said ionizing means is in the form of a disc.

18. The apparatus of claim 13, wherein said substrate means is in the form of a hollow right circular cylinder having said ionizing means mounted therein.

19. The apparatus of claim 18, wherein said ionizing means is in the form of a disc.

20. The apparatus of claim 13, wherein said substrate means has a second resistive member means mounted thereon, said ion collecting means having third and fourth portions adapted to develop third and fourth currents respectively when said ionizing means is energized in the presence of a fluid.

21. The apparatus of claim 13, wherein said means responsive to the point of impingement of the median ion includes potentiometer means having first and second fixed terminal means and variable position slider means therebetween, said first and second fixed terminal means being connected to said first and second end terminals respectively of said resistive member means.

22. The apparatus of claim 21, wherein said means responsive to the point of impingement of the median ion additionally comprises:

comparison means connected between said first and second end terminals, said comparison means developing output signals proportional to signals present at said first and second end terminals; and means responsive to said output signals of said comparison means for selectively changing the position of said variable position slider means of said potentiometer means.

23. The apparatus of claim 22, wherein said comparison means comprises differential amplifier means and said means responsive to said output signals of said comparison means comprises reversible motor means whereby said reversible motor means is energized by said differential amplified means in response to a potential difference thereacross to change the position of said variable position slider means of said potentiometer means so that said variable position slider means causes said potentiometer means to have a resistance ratio equal to that of said first and second portions of said resistance member due to the point of impingement of said median ion, said variable position slider means thereby indicating the displacement of said median ion.

24. The apparatus of claim 23, wherein said potentiometer means and said first and second portions of said resistance member means forms a resistance bridge.

25. The apparatus of claim 24, wherein said substrate means is in the form of a hollow right circular cylinder having a disc shaped ionizing means mounted therein.

26. The apparatus of claim 24, wherein said substrate means has a second resistive member means mounted thereon, said ion collecting means having third and fourth portions adapted to develop third and fourth currents respectively when said ionizing means is energized in the presence of a fluid, said means responsive to the point of impingement of the median ion additionally comprising:

second potentiometer means having a first and second fixed terminal means and second variable position slider means therebetween, said first and second fixed terminal means being connected in parallel with said second resistive member means;

second comparison means connected in parallel with said second resistive member means, and said comparison means developing output signals proportional to signals present at said first and second end terminals; and means responsive to said output signals of said comparison means for selectively changing the position of said variable position slider means of said second potentiometer means to thereby balance the resistance bridge formed by said second potentiometer mean and said third and fourth portions of said resistive member means.

References Cited

UNITED STATES PATENTS

| 2,514,235 | 7/1950 | Genin et al. |
| 2,611,268 | 9/1952 | Mellen. |
| 2,627,543 | 2/1953 | Obermaier. |
| 2,681,564 | 6/1954 | Jeromson et al. ____ 73—88.5 |
| 2,861,452 | 11/1958 | Morgan. |
| 3,188,862 | 6/1965 | Roth. |

CHARLES A. RUEHL, Primary Examiner

U.S. Cl. X.R.

73—181